(12) United States Patent
LaBarge (10) Patent No.: US 7,601,671 B2
(45) Date of Patent: Oct. 13, 2009

(54) DRYING METHOD FOR EXHAUST GAS CATALYST

(75) Inventor: William J. LaBarge, Bay City, MI (US)

(73) Assignee: Umicore AG & Co. KG, Hanau (DE)

( * ) Notice: Subject to any disclaimer, the term of this patent is extended or adjusted under 35 U.S.C. 154(b) by 810 days.

(21) Appl. No.: 10/975,899

(22) Filed: Oct. 28, 2004

(65) Prior Publication Data

US 2006/0094595 A1    May 4, 2006

(51) Int. Cl.
  B01J 23/00   (2006.01)
  B01J 21/00   (2006.01)
  B01J 20/00   (2006.01)
  B01J 29/00   (2006.01)
  B01J 37/00   (2006.01)

(52) U.S. Cl. .................. 502/326; 502/240; 502/245; 502/258; 502/259; 502/261; 502/262; 502/263; 502/302; 502/303; 502/304; 502/327; 502/330; 502/331; 502/332; 502/334; 502/335; 502/337; 502/339; 502/346; 502/348; 502/349; 502/350; 502/351; 502/355; 502/415; 502/439; 502/527.11; 502/527.12; 502/527.19

(58) Field of Classification Search .............. 502/240, 502/345, 258, 259, 261, 262, 263, 302, 303, 502/304, 326, 327, 330, 331, 332, 333, 334, 502/335, 337, 339, 346, 348, 349, 350, 351, 502/355, 415, 439, 527.11, 527.12, 527.19
See application file for complete search history.

(56) References Cited

U.S. PATENT DOCUMENTS

| | | | | |
|---|---|---|---|---|
| 4,144,189 A | * | 3/1979 | Kirkbride | 502/5 |
| 4,782,038 A | * | 11/1988 | Gandhi et al. | 502/304 |
| 5,010,051 A | * | 4/1991 | Rudy | 502/304 |
| 5,063,193 A | * | 11/1991 | Bedford et al. | 502/304 |
| 5,175,136 A | * | 12/1992 | Felthouse | 502/242 |
| 5,306,675 A | * | 4/1994 | Wu et al. | 502/5 |
| 5,672,557 A | * | 9/1997 | Williamson et al. | 502/303 |
| 5,741,467 A | * | 4/1998 | Williamson et al. | 423/213.5 |
| 5,876,680 A | * | 3/1999 | Chattha et al. | 423/213.5 |
| 5,948,723 A | * | 9/1999 | Sung | 502/303 |
| 5,950,421 A | * | 9/1999 | Chattha et al. | 60/274 |

(Continued)

OTHER PUBLICATIONS

Dinesh Agrawal,"Microwave Sintering, Brazing and Melting of Metallic Materials", Sonn International Symposium Advanced Processing of Metals and Materials: vol. 4, 2006.

*Primary Examiner*—Cam N Nguyen
(74) *Attorney, Agent, or Firm*—Robert G. Weilacher; Smith, Gambrell & Russell, LLP (57) ABSTRACT

A method for preparing an exhaust gas catalyst includes preparing a washcoat comprising a catalytically effective amount of at least one catalytically active metal disposed upon an oxide support; disposing the catalytically active metal-oxide support washcoat upon a catalyst substrate; drying the washcoated catalyst substrate using microwave energy to affix the precious metals to the oxide support; and conventionally calcining the dried washcoated catalyst substrate. The catalysts comprising a substrate having dispersed thereon an inorganic oxide washcoat, the washcoat having been affixed to the substrate by microwave drying, exhibit high exhaust gas purifying performance and long durability. The catalysts thus produced further provide a long in-service lifetime for reforming organic fuel species into hydrogen, carbon monoxide and light hydrocarbons used in the nitrogen oxides reduction process.

14 Claims, 3 Drawing Sheets

U.S. PATENT DOCUMENTS

| | | | |
|---|---|---|---|
| 6,022,825 A * | 2/2000 | Andersen et al. | 502/303 |
| 6,165,935 A * | 12/2000 | Williamson et al. | 502/339 |
| 6,182,443 B1 * | 2/2001 | Jarvis et al. | 60/274 |
| 6,255,249 B1 * | 7/2001 | Voss et al. | 502/263 |
| 6,344,635 B2 | 2/2002 | Brennan | |
| 6,423,293 B1 * | 7/2002 | Chun et al. | 423/579 |
| 6,436,363 B1 * | 8/2002 | Hwang et al. | 423/651 |
| 6,455,826 B1 | 9/2002 | Araya et al. | |
| 6,531,425 B2 * | 3/2003 | Golden | 502/302 |
| 6,540,968 B1 * | 4/2003 | Huang et al. | 423/213.5 |
| 6,625,976 B1 * | 9/2003 | Andersen et al. | 60/299 |
| 6,692,712 B1 * | 2/2004 | Andersen | 423/239.1 |
| 6,706,233 B2 * | 3/2004 | Araya et al. | 264/432 |
| 6,774,080 B2 * | 8/2004 | LaBarge et al. | 502/170 |
| 6,790,432 B2 * | 9/2004 | Ruettinger et al. | 423/656 |
| 6,927,189 B1 * | 8/2005 | de Alvaro et al. | 502/300 |
| 6,998,507 B1 * | 2/2006 | Ding et al. | 564/451 |
| 7,014,825 B2 * | 3/2006 | Golden | 423/213.2 |
| 7,364,712 B2 * | 4/2008 | Ohtsuka et al. | 423/245.3 |
| 7,371,706 B2 * | 5/2008 | Ohtsuka et al. | 502/339 |
| 2002/0109269 A1 | 8/2002 | Miura et al. | |
| 2004/0077911 A1 | 4/2004 | Woodle et al. | |

* cited by examiner

DRYING METHOD FOR EXHAUST GAS CATALYST

TECHNICAL FIELD

The present invention relates to exhaust gas catalysts and more particularly relates to a method for preparing an automotive exhaust NOx reducing catalyst system.

BACKGROUND

Catalytic converters are employed on motor vehicles to control atmospheric pollution. A catalytic converter typically consists of a ceramic or metallic monolithic substrate mounted within a metal housing. The ceramic or metallic monolithic substrate has a catalyst washcoat comprising a catalytic metal disposed on an inorganic oxide support. Preparation typically comprises coating a washcoat onto the exposed surfaces of the monolith. The washcoat is dried and the washcoated, dried, monolith substrate is calcined. The catalyst is responsible for the oxidation of hydrocarbons and carbon monoxide and the reduction of nitrogen oxides. These catalyst compositions have a very long service life without deactivation.

The improvement of engine efficiency from vehicles is a worldwide goal. Lean burn, high air-to-fuel ratio and diesel engines are certain to become more important in meeting the mandated fuel economy requirements of next generation vehicles. However, high NOx emissions from high air-to-fuel ratio diesel and lean burn engines cause significant environmental problems. Accordingly, development of effective and durable catalysts for controlling NOx emissions under net oxidizing conditions is critical.

This ongoing effort to reduce emissions creates challenges for the emissions design engineer. Catalysts of various types have been employed by themselves for the reduction of automobile emissions and have been effective in meeting the standards of the past. However, ever tightening regulations have made necessary a more complex system for controlling emissions. Catalysts are located closer to the engine for faster catalyst activity. Those catalysts are increasingly exposed to temperatures as high as 1200° C., and therefore excellent heat tolerance is required.

High catalyst bed temperatures cause complete hydrocarbon combustion wasting valuable species that could be used for NOx reduction. Reforming of the hydrocarbon portion into highly active reducing agents is necessary if high air-to-fuel ratio engines are to be increasingly used. Nanoscale sized catalyst constituents (that is, catalysts having particles of about 2 to about 80 nanometers, typically less than about 70 nanometers) are necessary for high efficiency fuel reforming and are therefore gaining in importance.

Another disadvantage is that the temperatures required for solid materials to react can be high enough that the reacted materials only form phases having a low surface area and therefore exhibit low catalytic activity.

Conventional precipitation methods yield products where one material substantially precipitates while a second material barely precipitates. Instead of a homogenous powder of a single material resulting, a simple physical mixture of two different materials results. Calcined autoclave generated powders often consist of large agglomerates of non-homogeneous catalyst particles.

In addition, conventional convection drying of catalyst materials dries the catalyst from the outside in. This causes the platinum group metals to migrate from the interior to the exterior surface of the inorganic oxide support structure. Platinum group metals at exposed surfaces are easily poisoned and quickly agglomerate into larger, less active particles.

When a washcoated substrate is impregnated with a platinum group metal solution, conventional drying (oven drying) causes the platinum group metals to migrate towards the outer regions of the substrate. Unfortunately, the exhaust gas flows primarily through the center of the substrate.

The moisture content of a washcoated substrate essentially drops below about 1 weight % of the total washcoat weight when the drying process ends and the calcinations process begins. Soluble species in the washcoat slurry are capable of plugging the inorganic oxide support porosity, particularly critical mesopores of about 10 to about 100 nanometers (average diameter). With conventional convection drying which dries from the outside in, species in solution migrate from the wet interior surfaces towards the dry exterior surfaces. As such, conventional convection dried washcoats have soluble binder migration towards the washcoated surface, increasing the washcoat density and plugged porosity at the washcoat surface relative to the washcoat subsurface.

There have been thousands of computer modeling studies of automotive exhaust systems. Still, today converters used in production are basically the same shapes and are located in about the same positions as first developed in 1972. Improvements in conversion have been largely due to better materials.

One useful piece of information gained from computer modeling is that the flow distribution through a substrate is not uniform. Most of the flow is through the center. As a result, all sorts of flow diverter valves, etc., have been designed to force the flow through the outer portion of the substrate. However, due to complications of implementation, as far as the present inventors are aware, no device has ever been adopted.

Catalyst materials and manufacturing development have not included changes that take advantage of these flow patterns. In fact, previous metals gradients in catalyst materials are directly opposite of the desired gradient. As a result of low precious metal deposition in the center of a substrate, precious metal concentrations must be increased such that the low concentration center has a sufficient concentration for the high quantity of exhaust flow. The precious metals deposited in high concentration at the edges of a substrate are wasted. The resultant increase in precious metal costs are a great disadvantage to manufacturers.

Catalytic reactions are time dependent. The faster exhaust gasses travel through a channel, the more active the catalyst must be. NOx reduction is particularly sensitive to residence time. To achieve high NOx efficiency, the catalyst must be sized large enough that the necessary residence time is obtained even at maximum exhaust flow rates.

When determining the proper sizing, it must be taken into account exhaust gas flow is not the same through all the substrate cells. Greater than about 65% of the exhaust gas flows through the cells in the substrate center which encompasses an area not more than about two inches in diameter. Much less exhaust gas flows through the substrate edges. The residence time in those center cells must be long enough to achieve the desired NOx reduction.

The precious metal concentration at the center cells of the substrate can be increased to achieve the desired catalytic reactions. However, since the precious metals are in the slurry, the high concentration is deposited over the entire wet washcoated substrate. The high concentrations of precious metals at the outer portion of the substrate are wasted. NOx reduction is accomplished on a rhodium surface. Rhodium is the most expensive of the precious metals used, and therefore the element we least desire to waste.

The wet washcoated substrates must be calcined. The most practical method of substrate calcinations involves placing the wet washcoated substrate on a belt furnace. As the belt moves forward and the substrate moves towards the "hot" zone, moisture evaporates from the exposed substrate surface. As the surface dries, the moisture inside the substrate migrates towards the dry substrate skin. Since the precious metal salts are water-soluble, the precious metals migrate with the moisture towards the outer substrate cells. As a result, the center cells of the calcined substrate end up with the lowest concentration of precious metals. The outer cells of the calcined substrate end up with the highest concentration of precious metals. The result is a distribution that requires the highest precious metal loading for a given NOx conversion.

One method used to correct for this unwanted distribution is use of a substrate shaped like a bullet, for example, configuring the center cells at about six inches long and the edge cells at about three inches long. Bullet nose substrates have about the same exhaust gas residence time in all of the substrate cells. Therefore, all the precious metal can be efficiently used. A bullet nose substrate with about 30% to about 40% less precious metals has the same NOx activity as a standard substrate.

The durability of the substrate is also a significant issue. The inlet face of a substrate tends to have erosion and breakage during the current useful life emission standard. In 2004, emission standards increased the useful life to 120,000 miles or 11 years. Further, if a vehicle manufacturer extends the useful life to 150,000 or 15 years, the manufacturer can receive additional NOx credits.

The current NOx standard for an ultra low emissions vehicle (ULEV) is 0.3 grams per mile. The 2004 NOx standard for a ULEV vehicle is 0.07 grams per mile. The new SULEV category reduces the NOx standard to 0.02 grams per mile. A significant increase in NOx reduction activity is required. One way to achieve such an increase is by adding more precious metals and more washcoat. This, however, means a significant increase in expense due to the high cost of precious metals.

To increase the exhaust gas residence time, the cell density can be increased from about 400 cells per square inch to about 600 or about 900 cells per square inch, and the cell wall thickness can be reduced from about 8 mil walls to about 2 mil walls. However, to extrude a higher cell density substrate with thinner walls, the substrate formulation has to contain less clay binder and more zirconium oxide. The resulting cell walls are stiffer, but not as strong.

Further, the cost of thin walled substrate is several times more expensive than the cost of a standard substrate. Also, the standard mat material loses mica, and the loose mica plugs the substrate face. Therefore, a ceramic alumina fiber mat must be used with thin walled substrates. The alumina mat exerts less peak pressure on the substrate and there is no mica in the alumina mat. Unfortunately, the alumina fiber mat can be more than double the cost of the intumescent mica mat.

Further, a standard converter has the full length of mat material to retain the substrate in the exhaust. The full length of "gripping" allows the force per unit area to be low enough that breakage during "stuffing" does not occur. In comparison, bullet nosed substrates have only half of the "gripped" area of standard shaped substrates. The pressure applied by the alumina mat must be increased to compensate. Thin walled substrates with increased mat density and lower "gripped" area present a processing challenge.

The shape of bullet nosed converters exposes many edges of the cell walls. The exposed cell walls easily fracture. Broken pieces of substrate tend to plug the inlet face of the substrate. Higher cell density substrates with thinner, stiffer walls will not meet durability requirements.

Finally, metal monolith substrates are made of very thin foils of about 0.02 to about 0.03 millimeters thickness. Bullet nosed substrates cannot be made from thin metal monolith foil because the edges fold over, resulting in a plugged frontal area.

U.S. Published Patent Application 20040077911 entitled "Lithium aluminate layered catalyst and a selective oxidation process using the catalyst" discloses a catalyst for the selective oxidation of hydrogen. The catalyst comprises an inert core such as cordierite and an outer layer comprising a lithium aluminate support. The forming process comprises drying a support layered with catalyst at a temperature of about 100° C. to about 350° C. followed by calcination at a temperature of about 400° C. to about 1300° C. In forming the lithium aluminate support, the alumina layered composition is impregnated with a lithium compound. The support is immersed in an impregnating solution and the resultant composite is allowed to dry under ambient temperatures or is dried at a temperature of about 80° C. to about 110° C. followed by calcination at a temperature of about 400° C. to about 300° C. thereby forming lithium aluminate. The disclosed method is typical of currently available catalyst preparation processes employing conventional drying for both drying and calcination steps.

In art areas not related to exhaust catalyst preparation, various methods for preparing ceramic honeycomb bodies include drying systems employing microwave drying and conventional oven drying. U.S. Published Patent Application 20020109269A1 entitled "Method of fabricating honeycomb body and drying system" discloses a method of fabricating at least a honeycomb body and a drying system. A honeycomb mold having a cell wall thickness of not larger than 0.125 mm can be dried without developing any cracking or wrinkles in the outer peripheral skin portion. In a method of fabricating a honeycomb mold (1) of ceramics having a multiplicity of cells (10) defined by the cell walls (11) having a thickness of not more than 0.125 mm arranged in the shape of honeycomb, each extrusion-molded argillaceous honeycomb body (1) is dried by being exposed to a high-humidity ambience of 70% or more while at the same time being irradiated with microwaves in the frequency range of 1,000 to 10,000 MHz.

U.S. Pat. No. 6,455,826 entitled "Apparatus and method for continuous microwave drying of ceramics" discloses an apparatus capable of continuous drying of ceramic articles which produces little or no microwave radiation emission. The drying apparatus comprises a microwave-heating chamber for heating a ceramic, having an entrance and an exit end and a material flow axis along which the ceramic articles are conveyed. Positioned adjacent the entrance and exit ends of the microwave-heating chamber, respectively, are a first and second attenuation chamber each having an entrance and an exit end. An inlet chamber, having a material flow path, is connected to the entrance end of the first attenuation chamber with a portion of the material flow path disposed at an angle to the flow axis. Connected to the exit end of the second attenuation chamber is an outlet chamber having a second material flow path; again at least a portion of the material flow path is at an angle to the material flow axis.

U.S. Pat. No. 6,344,635 entitled "Hybrid method for firing ceramics" discloses a method of firing ceramic materials involving placing the ceramic material in a microwave heating apparatus having a microwave cavity and subjecting the ceramic material to a combination of microwave radiation and conventional heat energy according to a predetermined time-temperature profile. The time-temperature profile, ranging from room temperature to sintering soak temperature, comprises a series of target heating rate temperature set points and a series of corresponding core and surface temperature set points with each of the core and surface temperature set points being offset from the target heating rate set points a predetermined offset temperature.

The disclosures of each of the foregoing U.S. Patents and U.S. Patent Applications are hereby totally incorporated herein by reference in their entireties. The appropriate components and process aspects of each of the foregoing U.S. Patents and U.S. Patent Applications may be selected for the present method and system in embodiments thereof.

A need remains in the art for an improved catalytic exhaust treatment device for sustained high temperature operation, i.e., temperatures greater than or equal to about 1050° C. There further remains a need for an improved method for preparing such a device.

SUMMARY

An automotive NOx reducing catalyst system and a method for preparing an automotive NOx reducing catalyst system are described. The method is particularly useful for preparing an exhaust gas catalyst comprising nanoscale catalyst powders. In a first embodiment, a process for preparing an exhaust gas catalyst is described comprising preparing a washcoat slurry comprising a catalytically effective amount of at least one catalytically active metal and an oxide support; disposing the washcoat slurry upon a catalyst substrate; drying the washcoat slurry and catalyst substrate using microwave energy to affix the catalytically active metal to the oxide support and catalyst substrate; and conventionally calcining the dried washcoated catalyst substrate.

In a second embodiment, a process for preparing an exhaust gas catalyst is described further comprising preparing the washcoat slurry by disposing a catalytically effective amount of at least one catalytically active metal upon an oxide support; drying the catalytically active metal disposed upon the oxide support using microwave energy to affix the catalytically active metal to the oxide support; and conventionally calcining the dried catalytically active metal-oxide support.

In a third embodiment, a process for preparing an exhaust gas catalyst is described further comprising preparing the oxide support by precipitating the oxide support from precursor solutions using energy supplied by a microwave source of energy.

In a fourth embodiment, a catalyst system is described comprising a washcoat comprising a catalytically effective amount of at least one catalytically active metal disposed upon an oxide support; the catalytically active metal-oxide support being disposed upon a catalyst substrate and dried using microwave energy to affix the precious metal to the inorganic oxide support; and wherein the microwave dried washcoated catalyst substrate is conventionally calcined.

In a fifth embodiment, a process for treating an exhaust gas is described comprising contacting the exhaust gas with a catalyst system as described herein. The exhaust gas comprises, for example, but is not limited to, NOx containing exhaust gas, soot-containing exhaust gas, internal combustion engine exhaust gas, diesel engine exhaust gas, or a combination thereof.

In embodiments, the catalytically active metal-oxide support washcoat comprises nanometer sized catalytically active metal particles. As used herein, disposing the catalyst washcoat onto the substrate contemplates all methods of disposing the washcoat onto the substrate including, but not limited to, surface deposition and impregnation. "Conventional calcination" refers to non-microwave calcination processes such as convection drying.

Advantageously, the drying process is effectively shortened by the present microwave drying of the washcoat/substrate while at the same time improving the quality of the product. Washcoat drying by conventional convection means takes about one to about three hours. In comparison, the present microwave drying takes about 10 minutes or less. Microwave energy with a wavelength of about 2.5 GHz used on aqueous solutions produces powder precursors in just a few minutes.

In addition, the present microwave drying method advantageously causes migration of precious metals to the center of the monolith, exactly where they are needed. A microwave dried three-way catalyst with about 30% less precious metals has the same NOx, CO, and HC conversion as a conventionally dried catalyst.

Further, the present microwave drying method advantageously provides a cost efficient method for catalyst preparation.

Another advantageous aspect of the present method and system is that low power microwave formation of powders yields different microstructures as compared to high temperature conventional sintering methods. This is due to reactivity and formation at lower temperatures than occurs with conventional sintering. Formation of powders using microwave energy has been found to yield a smaller and uniform grain structure as well as having more uniform dispersion of mixed metal oxides over conventional convection temperature processing.

Yet another advantageous aspect of the present method and system results in that microwave power generated decomposition occurs by different mechanisms than solubility, and, as such, microwave drying is able to form homogeneous materials that are difficult or impossible to form by conventional methods.

A further advantageous aspect of the described method and system is that, in contrast to conventional exhaust catalyst drying, the present microwave drying dries from the inside out. Microwave processing of liquid solutions is favorable to the uniform emission of gases from internal porosity.

These and other features and advantages will be more fully understood from the following description of certain specific embodiments taken together with the accompanying drawings.

DESCRIPTION

Figure 1:
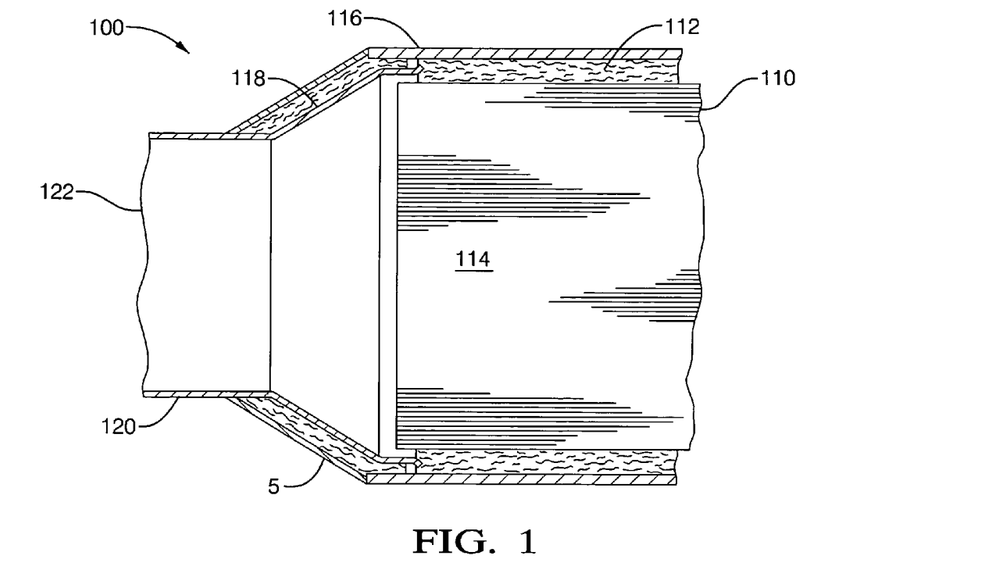
FIG. 1 is a partial cross-sectional view of an exhaust treatment device in accordance with the present system and method.

Referring now to FIG. 1, an exhaust treatment device 100 comprises a catalyst system including, but not limited to, alone or in combination, an automotive exhaust NOx reducing catalyst system, a diesel exhaust catalyst system, or a soot-containing exhaust catalyst system. The exhaust treatment device 100 may include, but is not limited to, the following examples: catalytic converters, evaporative emissions devices, scrubbing devices (for example, hydrocarbon, sulfur, and the like), particulate filters or traps, adsorbers, absorbers, and the like, as well as combinations comprising at least one of the foregoing devices. The exhaust treatment device 100 comprises a substrate 110 disposed within a retention material 112 forming a subassembly 114. A shell 116 is disposed around the subassembly 114. End cones 118 (one is shown) comprising a snorkel 120 having an opening 122 which is in physical communication with the shell 116 are disposed at opposite ends of the device 100. Opening 122 allows exhaust fluid communication with the substrate 110. As will be discussed in much greater detail, a catalyst is disposed on the substrate or throughout the substrate 110, for simplification referred to hereinafter as disposed "on" the substrate.

The present method for preparing an automotive exhaust NOx reducing catalyst comprises preparing a washcoat comprising at least one catalytically active metal disposed upon an inorganic oxide support; disposing the catalytically active metal-inorganic oxide support washcoat upon a catalyst substrate; and microwave drying the washcoated catalyst substrate.

In embodiments, the catalytically active metal is a precious metal, gold, silver, platinum or a platinum group metal (platinum, rhodium, palladium, iridium, ruthenium), osmium, tantalum, zirconium, yttrium, cerium, nickel, copper, and the like, as well as oxides, alloys and combinations comprising at least one of the foregoing metals, with platinum group metals, especially rhodium, and gold and silver being particularly preferred. The metal particles, such as platinum group metal particles, become significantly hotter than the inorganic support material when microwave calcined. This overheating of the platinum group metal initiates formation of unwanted inactive species such as, for example, rhodium aluminate. The present method provides in embodiments microwave drying the washcoated catalyst substrate in combination with conventional (non-microwave) calcination:

The platinum group metals selected include, in embodiments, platinum, rhodium, palladium, iridium, ruthenium, and mixtures and alloys of rhodium and platinum, iridium or palladium or mixtures thereof. In embodiments the platinum group metal is rhodium due to its ability to reform hydrocarbons rather than consume hydrocarbons in complete combustion reactions. In further embodiments, the catalytically active metal comprises a mixture of rhodium and platinum. Any platinum group metal reagent known to those skilled in the art may be employed. In embodiments, the platinum group metals have precursors selected from the group consisting of ammines, acetates, citrates, oxalates, acetonates, or mixtures thereof.

Microwave drying of the catalytically active metals disposed upon the inorganic oxide support yields different catalyst microstructures as compared to conventional convection drying. Compared with the conventional convection results, microwave processed catalysts have improved resistance to metal migration, such as platinum group metal migration, and therefore improved catalyst longevity.

In embodiments, the oxide support comprises an inorganic oxide, aluminum oxide, zirconium oxide, titanium oxide, aluminum-gallium oxide, aluminum oxide, zirconium oxide, titanium oxide, delta phase aluminum oxide, gamma phase aluminum oxide, stabilized oxides, lanthanum stabilized gamma phase aluminum oxide, barium stabilized gamma phase aluminum oxide, or a combination thereof.

A solid catalyst powder is prepared by mixing liquid solutions of a first metal precursor and a second metal precursor. Nucleation and precipitation of monodisperse particles is then accomplished by a process of applying microwave radiation to a reactor capacity. Compared with powders obtained by conventional methods, microwave synthetic methods provide nucleation and dehydroxylation of precursors at lower temperatures. Segregation of powders is avoided. Microwave techniques supplies energy to chemical reactants faster and more efficiently than conventional heating techniques. An increased reactivity is found, yielding higher conversion at lower temperatures than conventional precipitation methods.

Once dehydroxylation and precipitation have been completed, the catalyst support oxide is sintered by conventional calcination and not by microwave calcination.

For example, an exhaust treatment device such as shown in FIG. 1, comprising a shell 116 and a substrate 110 disposed within the shell 116, comprises a catalyst disposed on the substrate 110, wherein the catalyst comprises $Al_2O_3$—$Ga_2O_3$ and wherein the catalyst is capable of a uniform distribution of gallium in gallium-aluminum oxides formed at low temperatures from microwave treated solutions.

In accordance with the method, an aqueous solution containing, for example, a platinum group metal or metals is deposited upon the inorganic support oxide (substrate) 110 described in FIG. 1. After impregnation, the microwave drying step is performed to remove the free water from the inorganic support oxide so that the platinum group metal particles are strongly affixed. Microwave drying effects migration of the soluble platinum group metal precursors towards the internal porosity of the inorganic support oxides. Microwave energy causes a microwave-heated chamber to reach temperatures of about 75° C. to about 125° C., decomposing the platinum group metal uniformly and rapidly upon the inorganic oxide.

In aspects, the method comprises platinum group metal deposition upon the inorganic oxide support before preparing the washcoat slurry. This prevents the noble metal or its chemical precursors from interacting with any stabilizers, additives, and binders, which would negatively affect the performance of the catalyzed adsorber after aging. Typically, a washcoat having greater than or equal to about 90 weight % of the platinum group metals based on the total weight of the washcoat is disposed in the pores of the platinum group metal support, for example, gallium-doped aluminum oxide.

Figure 2:
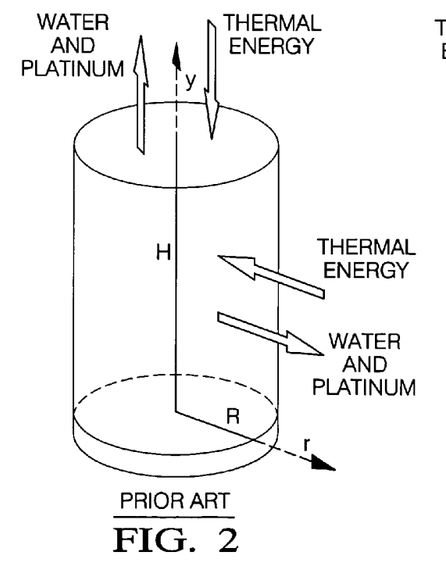
FIG. 2 is an illustration showing platinum group metal migration with convective drying.
Figure 3:
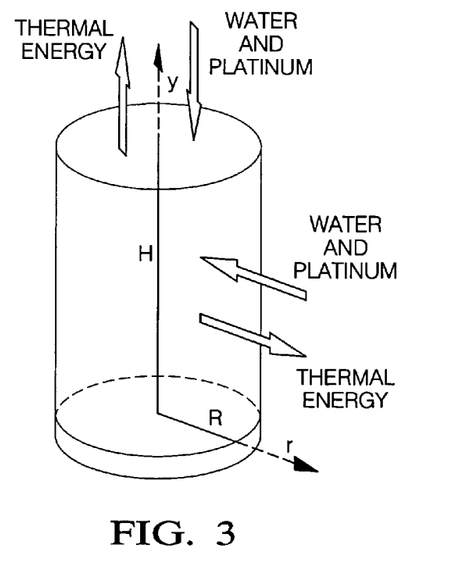
FIG. 3 is an illustration showing platinum group metal migration in accordance with the present microwave drying.

Conventional convection drying is specifically avoided for this step. Conventional convection drying of the wet inorganic support oxides causes migration of the soluble platinum group metal species out of the internal porosity and towards the surfaces of the inorganic support oxides. FIG. 2 illustrates this phenomenon. With convection drying, heat enters the substrate driving off water. Along with the water, the metal particles migrate away from the substrate center and towards the substrate outer surfaces. In contrast, FIG. 3 illustrates platinum group metal migration toward the substrate center with the present microwave drying.

Figure 6:
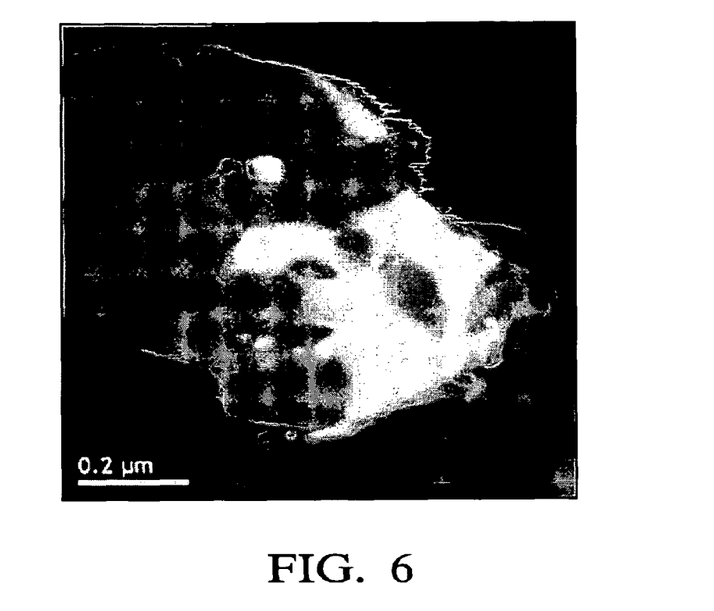
FIG. 6 is a photomicrograph showing large metal particle agglomeration at the surface of an inorganic oxide support that has been dried by conventional convective drying.

Surface deposition of the resulting platinum metals particles greatly increases the rate of platinum group metal(s) aggregation into larger less active particles. FIG. 6 is a microphotograph illustrating rhodium metal particles agglomerated on the surface of an inorganic oxide support that has been dried by conventional convection drying.

Figure 7:
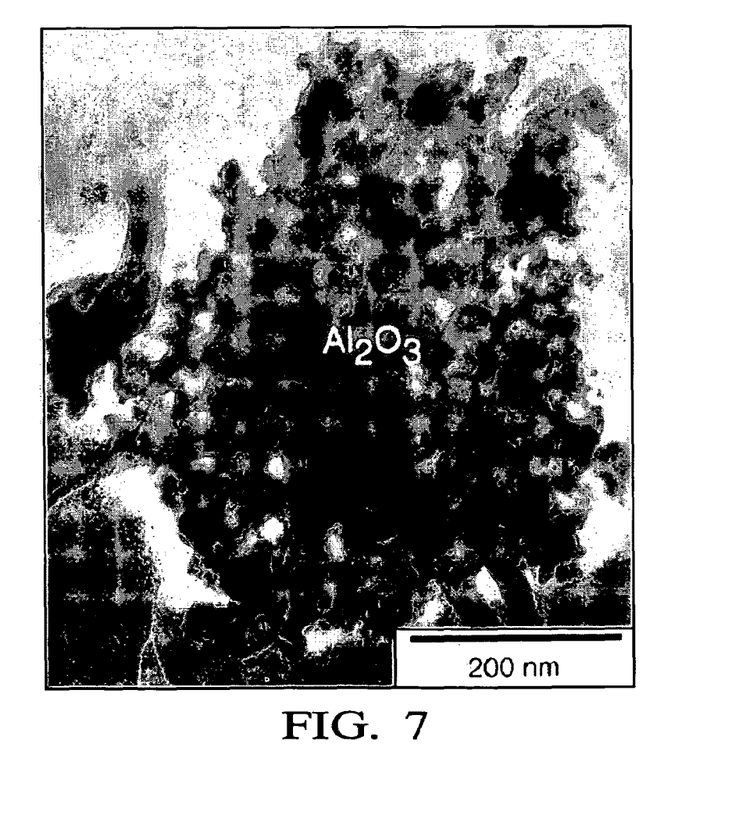
FIG. 7 is a photomicrograph showing absence of metal particle agglomeration at the surface of an inorganic oxide support that has been dried by the present microwave drying process.

Microwave drying reduces or eliminates altogether this undesirable surface metal aggregation. FIG. 7 is a microphotograph of an inorganic oxide support that has been microwave dried. FIG. 7 illustrates the absence of surface metal particle agglomeration at the surface of the inorganic oxide support when microwave drying is employed. The discrete metal particles resulting from use of the present microwave drying process are in embodiments less than about 4 nanometers in size across the greatest length of the particle.

In embodiments, drying the washcoated catalyst substrate comprises drying the washcoated catalyst substrate for a time sufficient to achieve a water concentration in the washcoat of about 0.001 weight % to about 2 weight %, based on the weight of the washcoat.

Once microwave drying is complete, the soluble compounds are no longer mobile and are unable to plug the inorganic support oxide pores. However, the washcoat must also be calcined to fully decompose the soluble compounds and form the ceramic bonds critical for good adhesion to the substrate. In another aspect of the present method, the washcoat is sintered by conventional convection drying and not by microwave drying thereby avoiding excessive heating of the platinum group metal particles. Microwave calcination heats the platinum group metal particles to excess as compared with the heating of the inorganic support oxides. Due to the high dielectric loss factor and good microwave-energy absorption ability of platinum group metal particles, platinum group metal crystallites absorb electromagnetic energy to a greater extent than the inorganic support materials(s). Excessive heating of the platinum group metal particles causes rapid aggregation of the metal particles into larger less active particles. Conventional calcination heats the platinum group metal particles and the inorganic support oxides uniformly. Platinum group metal aggregation during conventional calcination is thereby avoided.

The substrate 110 may be comprised of materials such as, but not limited to, cordierite, silicon carbide, metal, metal oxides and the like, and mixtures comprising at least one of the foregoing materials. The substrate may be in the form of a monolith (e.g., a honeycomb structure, and the like), an extruded monolith, stacked foils, porous structures, and combinations comprising at least one of the foregoing material forms. In embodiments, the substrate comprises an extruded structure such as an extruded honeycomb monolith structure, a calcium aluminate or calcium hexaaluminate extruded honeycomb monolith structure, or a calcium aluminate extruded honeycomb monolith structure with a cell density of at least about 400 cells per square inch.

The substrate 110 may be any of the shapes employed by those skilled in the art such as, but not limited to, extrudates, spheres, beads, tablets, ceramic foams, and the like, with monoliths, either metallic or ceramic, being preferred. If a monolith is employed as the substrate, it is sized and shaped so that it fits within whatever vessel is employed as a container leaving no gaps between the vessel interior wall and the outside surface of the monolith which might result in blow-by of the exhaust gas past the monolith.

Ceramic monoliths, if employed, are typically provided with a mat-mount between the exterior surface of the monolith and the vessel wall, as is customary in the industry, to cushion vibration during engine operation and to prevent blow-by of the engine exhaust gas past the catalyst. Metallic monoliths are attached to the vessel wall, as is customary.

Disposed between the substrate 110 and the housing 116 is a retention material 112 that insulates the housing 116 from both the high exhaust fluid temperatures and the exothermic catalytic reaction occurring within the catalyst substrate. The retention material 112 retains the substrate 110 reducing axial movement of the substrate. The retention material may be in the form of a mat, or the like, and may be an intumescent material (i.e., a particulate component that expands upon the application of heat), a non-intumescent material, a ceramic fiber, or a combination thereof.

Suitable materials for the housing 116 may comprise any material that is capable of resisting high temperature corrosion. For example, stainless steels and metal alloys containing nickel, chromium and/or iron. Ferritic stainless steels may include stainless steels such as, for example, the 400 Series such as SS-409, SS-439, and SS-441, with the grade SS-409 being generally preferred.

The device and method described herein takes advantage of the exhaust flow patterns wherein exhaust gas flows primarily through the center of the substrate. The present microwave drying of the catalytically active (e.g., platinum group) metals/washcoat/substrate causes the platinum group metals to migrate towards the center. Therefore, the highest concentration of platinum group metals is deposited in the region of highest exhaust gas flow and highest temperature region thereby improving the light off and steady state characteristics of the catalysts.

In embodiments, the formed catalyst powder is aluminum-gallium oxide and the platinum group metal is rhodium.

In embodiments, platinum group metal support oxides include inorganic oxide(s) such as, but not limited to, aluminum, zirconium, titanium, and the like, as well as compounds and mixtures comprising at least one of the foregoing, with aluminum, zirconium, titanium being preferred. In further embodiments, the materials have high surface area such as delta phase aluminum oxide or gamma phase aluminum oxide. In further embodiments, the materials are stabilized materials such as lanthanum stabilized gamma phase aluminum oxide and barium stabilized gamma phase aluminum oxide.

Additionally, while the primary particles are nanoscale, having a size in the range of about 2 to about 80 nanometers, the nanoscale particles may form agglomerates, clusters, and the like. A primary particle is a single particle, whereas an agglomerate typically comprises hundreds or thousands of primary particles. In embodiments, the agglomerates have an average major diameter of less than or equal to about 20 microns or less than or equal to about 10 microns. In various embodiments, the agglomerates may have average major diameters of less than or equal to about 5 microns. The agglomerate size may be determined after calcination, i.e., after the inorganic support oxide is disposed on, for example, a substrate and heated at temperatures up to about 500° C.

Substrate coating loads will depend on the engine and vehicle characteristics along with the catalyst capacity and platinum group metal activity, such as coating about 1 gram of washcoat to about 6 grams of washcoat per cubic inch of substrate, or about 2 grams of washcoat to about 5 grams of washcoat per cubic inch of substrate.

The relative proportions of metal oxide in the coating to be applied to the substrate may vary widely, for example, about 40 weight percent to about 80 weight percent.

Platinum group metal loading is a function of the metal chosen. For rhodium, the loading is typically, but is not limited to, about 5 to about 30 grams of rhodium per cubic foot of monolithic substrate or about 15 to about 30 grams of rhodium per cubic foot of monolithic substrate. For platinum, the loading is typically, but is not limited to, about 10 to about 70 grams of platinum per cubic foot of monolithic substrate or about 40 to about 70 grams of platinum per cubic foot of monolithic substrate. For iridium, the loading is about, but not limited to, about 0.5 to about 3.5 grams of iridium per cubic foot of monolithic substrate, or about 0.9 to about 1.8 grams of iridium per cubic foot of monolithic substrate.

In embodiments, the catalyst composition comprises about 90 weight % to about 95 weight % rhodium metal and about 5 weight % to about 10 weight % platinum metal, based upon the total weight of the platinum group metals.

In embodiments, the deposition of the platinum group metals is through the application of a suitable platinum group metal reagent directly to the support oxide fraction in the absence of stabilizers and binders. Other methods that result in the platinum group metal being dispersed predominately on the support oxide fraction and not on the inorganic oxide stabilizer and binder portion are known and may be employed as a matter of choice. Separating the platinum group metal from the inorganic oxide stabilizers and binders helps eliminate interactions between highly acidic and reactive platinum group metal solutions from the materials that allow large platinum group metal particle growth. This separation thus improves the durability of the catalyst as well as preserves the platinum group metal dispersion and limits potential poisoning of active platinum group metal sites by the mobile components from the inorganic oxide stabilizers, promoters and binders during high temperature aging. This action also improves the durability of the platinum group metal thereby improving aged light off and steady state conversion of hydrocarbons, carbon monoxide and hydrogen with which the catalyst is contacted. Having the noble metal in close proximity to the promoters such as zirconium prevents coking of the zirconium and enhances reformation of hydrocarbon.

In addition to the support and catalyst compounds, the washcoat may comprise one or more surfactants, stabilizers, binders, promoters, and the like, or combinations thereof. An inorganic oxide stabilizer, such as a zirconium oxide, serves to stabilize the support oxides such as aluminum oxide. Inorganic oxide stabilizers include, but are not limited to, zirconium oxide, which has both acidic and basic properties and is adept at both oxidizing and reducing properties. The zirconium oxide itself may optionally be stabilized with calcium, barium, yttrium, magnesium, aluminum, lanthanum, cesium, gadolinium, and the like, as well as oxides, alloys, and combinations comprising at least one of the foregoing materials. For example, the inorganic oxide stabilizer is, in embodiments, yttrium stabilized zirconium oxide.

In embodiments, the surfactant is present in a concentration of about 0.001 weight % to about 2 weight % based on the total weight of the washcoat. Generally, the amounts of stabilizers are about 1 mole percent (mol. %) to about 8 mol. % or so, or about 3 mol. % to about 7 mol. %, based upon the total amount of the inorganic support oxides and stabilizers.

A binder serves to improve the adhesion of the calcined washcoat as a whole. Suitable binders include, for example, but are not limited to, acidic aluminum oxide sol, alkaline aluminum oxide sol, and ammonium aluminum oxide sol. In embodiments, an alkaline binder is used to prevent dissolution and redistribution of particles. The ammonium sol of aluminum oxide is included in embodiments in an amount of at least about 1 weight %, at least about 2 weight %, or at about 3 weight %.

The calcined, impregnated washcoat is then slurried in water and its pH is adjusted to about 3.1 to about 3.9 by the addition of organic acid, such as, in embodiments, acetic acid. The washcoat slurry is milled for about twenty minutes to obtain a d90 particle size average between about 3.5 and 5.5 microns.

Generally, the washcoat comprises one layer. The layer comprises, for example, a platinum group metal, such as rhodium, an inorganic platinum group metal support such as barium hexaaluminate, a platinum group metal promoter such as zirconium oxide, and an inorganic binder such as aluminum nitrate. As used herein, disposing the washcoat onto the substrate contemplates that the washcoat is washcoated, imbibed, impregnated, physisorbed, chemisorbed, precipitated, or otherwise applied onto and/or within the substrate.

The calcined, platinum group metal impregnated support oxide is mixed with water to make a washcoat slurry. The washcoat slurry pH is adjusted from about 4.0 to about 9.0 by the addition of an organic acid or base, preferably tetramethylammonium hydroxide (TMAOH). Additional promoters or additives can be added directly to the slurry, if desired. Acids such as nitric acid should be avoided due to their tendency to re-disperse the platinum group metal. The washcoat suspension is then coated over a substrate at a deposited washcoat thickness of more than about 30 microns.

After the resulting slurry is applied to the substrate by any of the methods known to those skilled in the art, the coated substrate is microwave dried. The microwave dried part is then calcined by conventional methods such as through a belt furnace at a temperature of about 350° C. to about 550° C. for about 4 hours.

Substrate coating loads will depend on the engine and vehicle characteristics along with the catalyst capacity and platinum group metal activity, but are generally coated with about 1 gram of washcoat to about 6 grams of washcoat per cubic inch of substrate, or about 2 to about 5 grams of washcoat per cubic inch of substrate, although not limited. A standard washcoat loading is for the aluminum oxide portion to be about 2.5 to about 3.0 grams per cubic inch ($g/in^3$) and for the non-catalyzed zirconium promoter loading up to about 1.0 $g/in^3$, or about 0.8 to about 1.0 $g/in^3$, or about 0.9 to about 1.0 $g/in^3$.

The following examples are being supplied to further define the present invention, it being noted that these examples are intended to illustrate and not limit the scope of the present invention.

EXAMPLE 1

Drying Support Oxides

A binary mixed metal oxide consisting of gallium and aluminum (97.0 mol. % Al, 3.0 mol. % Ga) was prepared from the co-precipitation of aluminum nitrate ($Al(NO_3)_3 \cdot 9H_2O$) and gadolinium nitrate ($Ga(NO_3)_3 \cdot xH_2O$) with an effective amount of ammonia added to the solution. The precipitated gallium-aluminum hydroxide nanocrystallites were microwave dried using a 2.45 GHz low-cost, mass-produced domestic microwave oven at 100% power until the powder reached a temperature of not greater than about 125° C. as measured by infrared thermometry. The resulting microwave dried clusters of nanoparticles were subsequently convective oven calcined under steam-rich conditions at about 600° C. to about 650° C. and about 1 atmosphere. Convective calcination of the gallium doped boehmite aluminum oxide yielded a gallium oxide stabilized transition aluminum oxide. The prepared catalysts were characterized by $N_2$ adsorption, temperature programmed reduction, selective hydrogen chemisorptions and X-ray diffraction (XRD). Calcined particle sizes ranged in a relatively narrow pore size distribution of about 60 nanometers to about 100 nanometers. The measured surface area was greater than about 125 ml/g. Microwave heating changed the susceptibility of the $Ga\text{—}Al_2O_3$ catalysts to loss of surface area. Excellent pore distributions were found in the powders prepared in this example.

EXAMPLE 2

Platinum Group Metal Drying

Preparation of platinum group metals dispersed upon γ-aluminum oxide inorganic support particles. The platinum group metal rhodium was impregnated upon aluminum oxide particles prepared by adding rhodium tetraacetate in a volume of solution approximately equal to the amount of solution the aluminum oxide can adsorb without being saturated. The impregnation was carried out at room temperature or not more than about 40° C. The rhodium impregnated aluminum oxide powder was microwave dried using a 2.45 GHz low-cost, mass-produced domestic microwave oven at 100% power over a period of 30 minutes. The water was reduced to below about 0.4 weight % during the microwave drying and the temperature was measured with infrared thermometry. The resulting microwave dried, rhodium acetate impregnated gamma-delta aluminum oxide was subsequently calcined at about 500° C. in a convective oven over a 4 hour period. The acetates were removed during the convective calcination. Microwave drying enhances the displacement of air pockets within the pores increasing the ability of the impregnating solution to enter the mesopores. Further, microwave drying decomposes the rhodium acetate at much milder conditions thereby reducing the crystallite size and increasing the catalyst activity. In this example, microwave drying reduces the rhodium metal migration from the internal porosity of the aluminum oxide agglomerate. Therefore, greater than about 60 weight % of the rhodium metal remains as particles below about 2 nanometers (nm) in size. Rhodium particles below about 2 nm cannot be seen by TEM bright field images and as shown in FIG. 7, there are no large agglomerated rhodium particles when microwave drying is used. Typical convective drying causes large rhodium metal clusters, such as greater than about 60 wt % of the rhodium metal agglomerates in the outer surface or skin of the particle, as shown in FIG. 6.

EXAMPLE 3

Washcoat Drying

Figure 4:
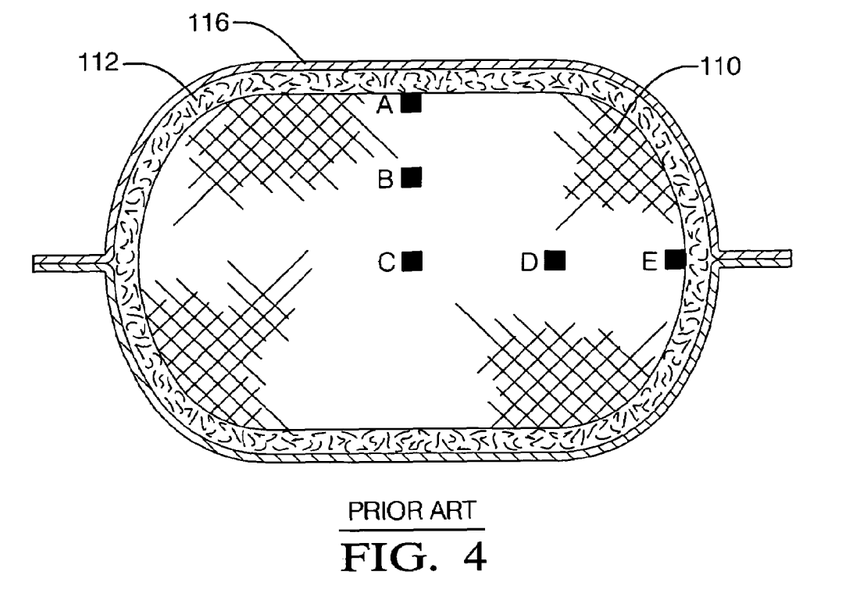
FIG. 4 is an illustration showing platinum concentration being greater at outer surfaces of a substrate after convective drying.
Figure 5:
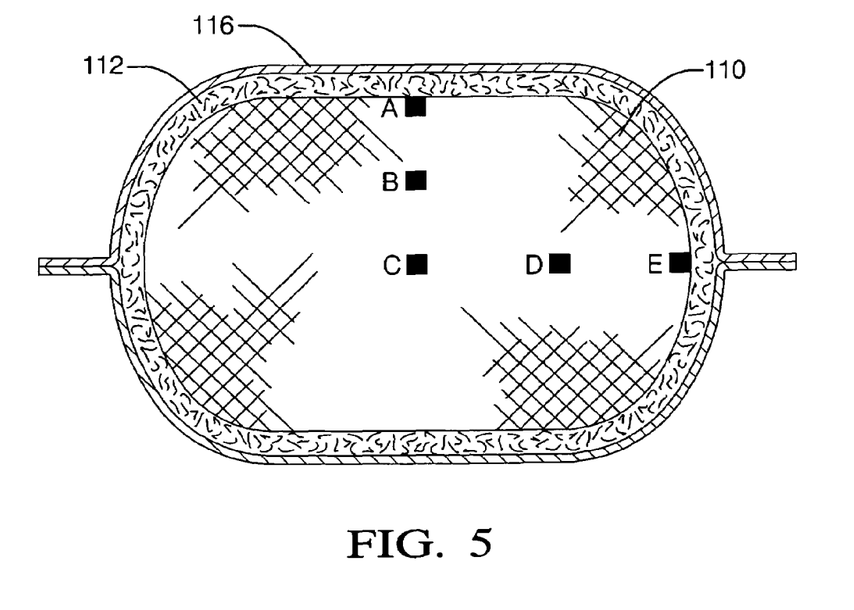
FIG. 5 is an illustration showing platinum concentration being greater at the center of a substrate after the present microwave drying.

A washcoat slurry was prepared by adding rhodium acetate, platinum acetate, barium stabilized gamma-delta aluminum oxide, zirconium tetraamine citrate, an aluminum hydroxide solution and water to achieve about 52 weight % solids in an aqueous slurry. The slurry was ball milled for about 4 hours. The slurry was washcoated upon a 400 cell/in$^3$ extruded hexaaluminate monolithic substrate. The washcoated monolith was microwave dried using a 2.45 GHz low-cost, mass-produced domestic microwave oven at 100% power over a period of about 30 minutes. The water was reduced to below about 0.4 weight % during the microwave drying. The resulting microwave dried rhodium acetate, platinum acetate, impregnated barium doped gamma-delta aluminum oxide, zirconium citrate and aluminum hydroxide coated substrate was subsequently calcined at about 500° C. in a convective oven over about a 4 hour period. The carboxylate organic constituents were removed during the convective calcination. The calcined substrate contained about 3.0 grams of washcoat for every 1.0 in$^3$ of substrate volume. The calcined washcoat comprised about 1.4 weight % rhodium metal, about 0.6 weight % platinum metal and about 92.0 weight % barium stabilized gamma-delta aluminum oxide that has been grain boundary stabilized with about 3.0 wt. % zirconium oxide derived from the zirconium tetraamine citrate. The washcoat was bound together and to the substrate with about 3.0 weight % of aluminum oxide derived from the aluminum hydroxide solution. The finished monoliths had a washcoat consisting of an average composition of about 2.76 g/in$^3$ barium stabilized gamma-delta aluminum oxide, about 0.09 g/in$^3$ aluminum oxide, about 0.09 g/in$^3$ zirconium oxide, about 0.04 g/in$^3$ rhodium and about 0.02 g/in$^3$ platinum. FIGS. 4 and 5 schematically illustrate a monolith substrate coated with the washcoat of the example and dried in accordance with conventional convective drying (FIG. 4) and microwave drying (FIG. 5). The monolith comprised a 400 cell per square inch substrate having a cross section taken about one inch back from the inlet face with a nominal platinum loading of about 0.58 weight % of washcoat. Letters A, B, C, D and E represent locations on the monolith face where representative platinum concentrations were measured. The catalytically active metal concentrations can be determined as solutions using methods such as atomic absorption spectrometry (AAS) or inductively coupled plasma (ICP) spectroscopy, or using solid methods such as X-ray Fluorescence (XRF) and graphite furnace atomic absorption spectrometry (GFAAS). The catalytically active metal concentrations for samples A-E were determined by analyzing aqueous solutions using atomic absorption spectroscopy. Approximately 0.25 inch round core samples were taken from the substrates at the locations A, B, C, D, and E. The cores that were sampled starting at about 1.00 inch and ending at about 1.50 inch behind the front face. The about 0.25 inch round by about 0.50 inch long samples were dissolved in a boiling mixture of nitric acid-hydrochloric acid-hydrofluoric acid. Complete dissolution of the catalytically active metal, inorganic support oxide and substrate was observed. The concentrations of samples A-E as determined by AAS, are summarized in Table 1.

TABLE 1

| Platinum Concentrations at Selected Locations Weight % | | |
|---|---|---|
| | Convective Drying | Microwave Drying |
| A | 1.6 | 0.45 |
| B | 0.8 | 0.71 |
| C | 0.38 | 1.74 |
| D | 0.68 | 0.57 |
| E | 1.1 | 0.28 |

FIG. 5 illustrates metal concentration maximized at the center of the substrate with the present microwave drying. Due to microwave induced migration of precious metals, the region "E" near the substrate shell consisted of less than 0.01 g/in$^3$ platinum while the region "C" near the substrate center consisted of more than 0.05 g/in$^3$ platinum.

In certain embodiments, two or more washcoat layers are deposited on the substrate to achieve an optimal catalyst system. The two or more layers may be formed of the same or different inorganic support oxides. For example, the first deposited layer may consist of an inorganic support oxide optimized for hydrocarbon storage, and the second deposited layer may consist of an inorganic support oxide optimized for nitrogen oxide reduction. The first layer may be microwave dried then calcined before or after deposition of the second layer.

The various embodiments of the present invention provide advantages over the prior art in that: (1) Microwave drying is the only drying method that can dry a substrate center before drying a substrate skin; (2) Drying a substrate center first causes migration of precious metals towards that drying center; (3) Microwave energy delivers a uniform application of energy to the entire ceramic substrate; (4) Microwave heating provides a higher heating rate; (5) Microwave heating is much faster than conventional drying because the ceramic body is heated directly through the interaction of the microwave energy with the ceramic body; (6) Microwave drying time can be shorter for example by one order; (7) Microwave drying does not create surface tension resulting in crust or cracks in the washcoat; (8) Microwave drying eliminates platinum group metal precursor surface tension resulting in smaller precious metal clusters; (9) Water and binders absorb microwaves stronger than materials in porous ceramic structures and therefore they are heated, or expelled, faster; (10) Microwave energy can be used for drying (approximately 2.5 GHz) or sintering of ceramics (approximately 30 GHz); (11) One microwave appliance can dry various products by adjusting microwave parameters; (12) Microwave driers can be switched off during breaks; (13) Microwave appliances do not require preheating; and (14) Microwave drying (from inside out) can be combined with conventional drying (from outside in).

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A process for preparing an exhaust gas catalyst comprising:
    preparing a washcoat slurry comprising a catalytically effective amount of at least one catalytically active metal and an oxide support to form a catalytically active metal-oxide support;
    disposing the washcoat slurry upon a catalyst substrate;
    drying the washcoat slurry and catalyst substrate using microwave energy to affix the catalytically active metal to the oxide support and catalyst substrate; and
    calcining the dried washcoated catalyst substrate, wherein the at least one catalytically active metal is selected from the group consisting of gold, silver, platinum, rhodium, palladium, iridium, ruthenium, osmium, tantalum, zirconium, yttrium, cerium, nickel, copper, oxides thereof, alloys thereof and combinations thereof.

2. The process of claim 1, wherein preparing the washcoat slurry further comprises:
    disposing a catalytically effective amount of at least one catalytically active metal upon an oxide support to form a catalytically active metal-oxide support;
    drying the catalytically active metal disposed upon the oxide support using microwave energy to affix the catalytically active metal to the oxide support; and
    calcining the dried catalytically active metal-oxide support.

3. The process of claim 1, further comprising:
    preparing the oxide support by precipitating the oxide support from precursor solutions using energy supplied by a microwave source of energy.

4. The process of claim 1, wherein the catalytically active metal-oxide support washcoat comprises nanometer sized catalytically active metal particles.

5. The process of claim 1, wherein the at least one catalytically active metal comprises a mixture of rhodium and platinum.

6. The process of claim 1, wherein the catalytically active metals include precursors selected from the group consisting of ammines, acetates, citrates, oxalates, acetonates, or mixtures thereof.

7. The process of claim 1, wherein the step of preparing a washcoat slurry comprises disposing a catalytically effective amount of at least one catalytically active metal upon an oxide support in the absence of stabilizers and binders.

8. The process of claim 1, wherein the step of preparing a washcoat slurry comprises disposing a catalytically effective amount of at least one catalytically active metal upon an oxide support.

9. The process of claim 1, wherein the washcoat slurry further comprises one or more surfactants, stabilizers, binders, promoters, or combination thereof.

10. The process of claim 1, wherein the washcoat slurry further comprises a surfactant present in a concentration of about 0.001 weight % to about 2 weight %, based on the total weight of the washcoat.

11. The process of claim 1, wherein a microwave dried oxide support comprises precious metal particles having a length of less than about 4 nanometers across the greatest length of the particle.

12. The process of claim 1, wherein drying the washcoated catalyst substrate comprises drying the washcoated catalyst substrate for a time sufficient to achieve a water concentration in the washcoat of about 0.001 weight % to about 2 weight %, based on the weight of the washcoat.

13. The process of claim 1, wherein the catalyst substrate comprises a monolith, an extruded monolith, an extruded honeycomb monolith, stacked foils, a porous structure, a calcium aluminate extruded honeycomb monolith, a calcium hexaaluminate extruded honeycomb monolith, or a combination thereof.

14. The process of claim 1, wherein the oxide support comprises an inorganic oxide, aluminum oxide, zirconium oxide, titanium oxide, aluminum-gallium oxide, delta phase aluminum oxide, gamma phase aluminum oxide, stabilized oxides, lanthanum stabilized gamma phase aluminum oxide, barium stabilized gamma phase aluminum oxide, or a combination thereof.

* * * * *